(12) United States Patent
Park

(10) Patent No.: US 12,481,582 B2
(45) Date of Patent: Nov. 25, 2025

(54) STORAGE DEVICE FOR CHANGING MAP UPDATE MODE

(71) Applicant: SK hynix Inc., Icheon-si (KR)

(72) Inventor: Sung Jin Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/444,404

(22) Filed: Feb. 16, 2024

(65) Prior Publication Data

US 2025/0086105 A1    Mar. 13, 2025

(30) Foreign Application Priority Data

Sep. 7, 2023   (KR) .................... 10-2023-0119113

(51) Int. Cl.
*G06F 12/02*  (2006.01)
*G06F 12/0891*  (2016.01)

(52) U.S. Cl.
CPC .......... *G06F 12/0246* (2013.01); *G06F 12/02* (2013.01); *G06F 12/0891* (2013.01); *G06F 2212/7201* (2013.01)

(58) Field of Classification Search
CPC ............. G06F 12/0246; G06F 12/0891; G06F 2212/7201; G06F 12/02
See application file for complete search history.

(56) References Cited

U.S. PATENT DOCUMENTS

| | | | |
|---|---|---|---|
| 2017/0315925 A1* | 11/2017 | Yeh ..................... | G06F 12/1009 |
| 2019/0114255 A1 | 4/2019 | Jain | |
| 2019/0303285 A1* | 10/2019 | Park ....................... | G06F 3/0679 |
| 2020/0201774 A1* | 6/2020 | Park .................... | G11C 11/5642 |
| 2021/0026548 A1* | 1/2021 | Kang .................. | G06F 12/0246 |
| 2025/0068336 A1* | 2/2025 | Lee ....................... | G06F 3/0622 |

FOREIGN PATENT DOCUMENTS

KR    20210112548 A    9/2021

* cited by examiner

*Primary Examiner* — Jared I Rutz
*Assistant Examiner* — Chen Gu
(74) *Attorney, Agent, or Firm* — Perkins Coie LLP

(57) ABSTRACT

A storage device includes a memory apparatus configured to store logical to physical (L2P) information, and a controller coupled to be in communications with the memory apparatus and configured to selectively change a map update mode based on a map update history after performing a map management operation on the L2P information.

17 Claims, 9 Drawing Sheets

STORAGE DEVICE FOR CHANGING MAP UPDATE MODE

CROSS-REFERENCES TO RELATED APPLICATION

This patent document claims the priority and benefits of Korean application number 10-2023-0119113, filed on Sep. 7, 2023, which is incorporated herein by reference in its entirety as part of the disclosure of this patent document.

TECHNICAL FIELD

The technology and implementations disclosed in this patent document generally relate to a data storage device including a memory apparatus.

BACKGROUND

A data storage device may be configured to store data provided from an external device such as a host device in response to a write request received from the external device and may also be configured to provide stored data to the host device in response to a read request from the external device. Such a data storage device may include a memory apparatus for storing data.

SUMMARY

A storage device based on an embodiment of the disclosed technology may include: a memory apparatus configured to store data that includes logical to physical (L2P) information on mapping between logical addresses and physical addresses; and a controller coupled to be in communication with the memory apparatus and configured to set a map update mode by selectively changing a current map update mode to a different map update mode based on a map update history after performing a map management operation for storing the L2P information in the memory apparatus.

A storage device based on an embodiment of the disclosed technology may include: a memory apparatus configured to store data including logical to physical (L2P) segments; and a controller coupled to be in communication with the memory apparatus and configured to include a controller memory and configured to perform a map management operation on first L2P segments based on the number of first L2P segments to be loaded into the controller memory when a map update mode is a first mode, to perform the map management operation on second L2P segments based on the number of second L2P segments loaded into the controller memory when the map update mode is a second mode different from the first mode, and to set the map update mode to the first mode or the second mode based on the number of third L2P segments flushed from the controller memory to the memory apparatus.

A storage device based on an embodiment of the disclosed technology may include: a memory apparatus configured to store L2P segments; and a controller coupled to be in communication with the memory apparatus and configured to include a controller memory and configured to perform a map management operation by loading first L2P segments from the memory apparatus to the controller memory when a map update mode is a first mode, and to set the map update mode to the first mode or a second mode based on a range of first logical addresses for which map information is updated in the first L2P segments through the map management operation. When the map update mode is set to the second mode, the controller may flush second L2P segments to the memory apparatus based on the number of second logical addresses for which map information is updated in the second L2P segments stored in the controller memory during a predetermined period. The controller may set the map update mode to the first mode or the second mode based on a range of the second logical addresses after flushing the second L2P segments to the memory apparatus.

DETAILED DESCRIPTION

Hereinafter, embodiments of the disclosed technology are described in detail with reference to the drawings.

The storage device may generate map information (or mapping information) that can be used to map logical addresses received from the host device through a write request to physical addresses of the memory apparatus. The map information may be updated each time the host device writes new data. However, when a map management operation is performed to update and store the map information, the operational performance of the storage device may deteriorate due to the overhead such as extra memory, bandwidth, or other resources required to perform the map management operation.

Figure 1:
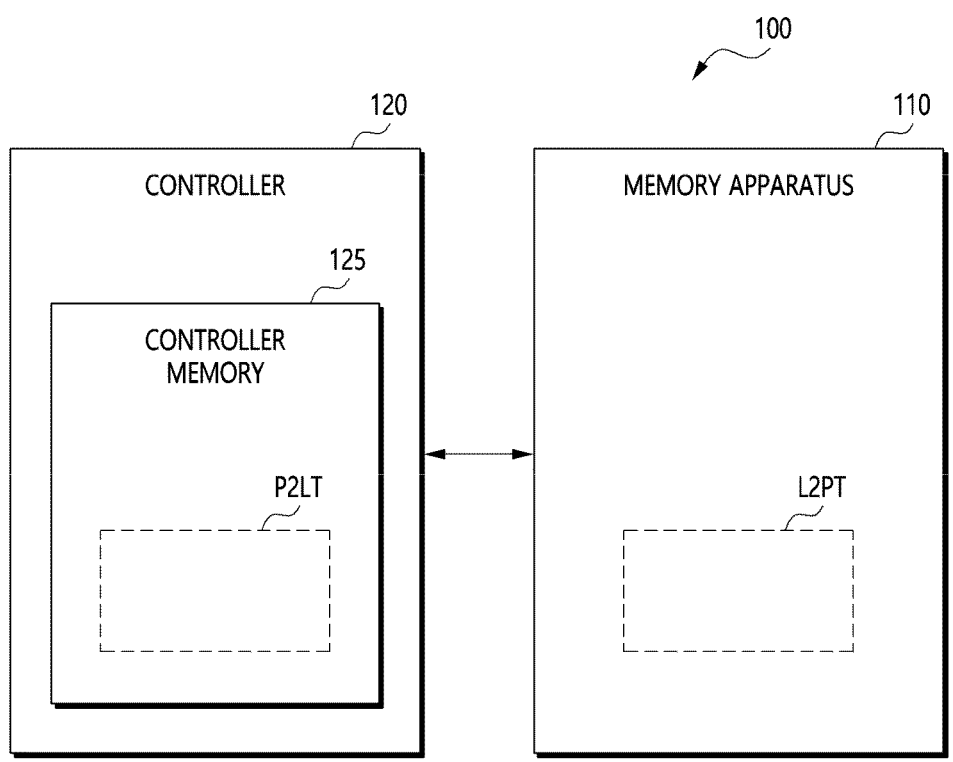
FIG. 1 is a block diagram illustrating an exemplary storage device based on an embodiment of the disclosed technology.

FIG. 1 is a block diagram illustrating an exemplary storage device 100 based on an embodiment of the disclosed technology.

Referring to FIG. 1, the storage device 100 may store data received from an external device (e.g., a device disposed outside the storage device 100) in response to a write request received from the external device (e.g., a host device (not illustrated)). The storage device 100 may transmit stored data to the external device in response to a read request received from the outside. In some implementations, the term "storage device" may be used to indicate a data storage device.

The external device of the storage device 100 may include the host device. The host device may include, for example, a computer such as a personal computer (PC), an ultra mobile PC (UMPC), a workstation, a personal digital assistants (PDA), a tablet PC, a mobile phone, a smart phone, an electronic book (e-book), a portable multimedia player (PMP), a portable game machine, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, vehicles, robots, and drones that can operate under human control or autonomously, a virtual reality (VR) device that provides two-dimensional or three-dimensional virtual reality images, an augmented reality (AR) device that provides augmented reality images, or others. A controller may be separate from the host device or may be included in the host device.

The storage device 100 may include personal computer memory card international association (PCMCIA) cards, smart cards, memory sticks, various multimedia cards (MMC, eMMC, RS-MMC, and MMC-micro), secure digital (SD) cards (SD, Mini-SD, and Micro-SD), universal serial bus (USB) cards, universal flash storages (UFSs), solid state drives (SSDs), or others.

The storage device 100 may include a memory apparatus 110 and a controller 120.

The memory apparatus 110 may perform internal operations under the control of the controller 120. The internal operations of the memory apparatus 110 may include a read operation, a write operation (program operation), an erase operation, or others. The memory apparatus 110 may store data under the control of the controller 120.

The memory apparatus 110 may include one or more nonvolatile memory apparatuses 110. The nonvolatile memory apparatus 110 may include, for example, a NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or others.

The controller 120 may control overall operations of the storage device 100. The controller 120 may store data received from the external device. The controller 120 may also store, in the memory apparatus 110, management data necessary for operations of the storage device 100. The management data may include, for example, logical to physical (L2P) information L2PT. The L2P information L2PT may include map information on mapping between logical addresses and physical addresses. The logical address may be assigned by the host device and may be translated or mapped to the physical address corresponding to a memory area in the memory apparatus 110 where data is actually located or stored.

The controller 120 may include a controller memory 125. The controller 120 may use the controller memory 125 as a buffer and cache. The controller 120 may store, in the controller memory 125, the management data necessary for operations of the storage device 100. For example, the controller 120 may load the L2P information L2PT in units of L2P segments from the memory apparatus 110 and store the L2P information L2PT in the controller memory 125. The controller 120 may also store physical to logical (P2L) information (physical address to logical address information) P2LT in the controller memory 125. The P2L information P2LT may include map information on mapping between physical addresses and logical addresses.

The controller 120 may flush data stored in the controller memory 125 to the memory apparatus 110. In other words, the controller 120 may move information from the controller memory 125 to the memory apparatus 110, and then erase, deallocate, or initialize the controller memory 125 to efficiently use the limited memory space of the memory apparatus 110 with limited capacity and prepare for the case where the power supply to the storage device 100 is abnormally interrupted.

The controller memory 125 may include a nonvolatile memory apparatus or a volatile memory apparatus. The volatile memory apparatus may include a dynamic random access memory (RAM), a static random access memory (SRAM), or others.

In some embodiments of the disclosed technology, the controller 120 may set a map update mode to one of a plurality of modes, and map information (mapping information) may be updated based on the set map update mode. In some embodiments, the controller updates mapping information between the logical addresses and the physical addresses at different frequencies or in different ways depending on the update mode. For example, the controller 120 may set a map update mode to one of a first mode and a second mode. For example, the first mode may include a logical to physical (P2L) update mode, and the second mode may include a direct L2P update mode. In one example, in the P2L update mode, the controller memory 125 updates the P2L information P2LT with priority over L2P segments loaded into the controller memory 125 in response to a write request and the L2P segments loaded into the controller memory 125 are updated based on the P2L information P2LT. In one example, in the direct L2P update mode, the controller memory 125 performs updates without prioritizing the P2L information P2LT, for example, immediately updates the L2P segments loaded into the controller memory 125 in response to a write request. At the time of booting of the storage device 100, the controller 120 may set the map update mode to any one of the P2L update mode and the direct L2P update mode.

The controller 120 may perform a map management operation on the L2P information L2PT. The map management operation may be an operation for storing, in the memory apparatus 110, the P2L information P2LT and map information on the L2P segments stored in the controller memory 125. In one example, the P2L information P2LT and the map information on the L2P segments may be permanently stored in the memory apparatus 110. The map management operation may be an operation for updating the L2P information L2PT stored in the memory apparatus 110 to the latest L2P information changed due to an operation of the host device.

When the current map update mode is the P2L update mode, the map management operation may be performed by: loading one or more L2P segments from the memory apparatus 110 to the controller memory 125 in order to update map information according to the P2L information P2LT; updating L2P segments stored in the controller memory 125 based on the P2L information P2LT; flushing all L2P segments stored in the controller memory 125 to the memory apparatus 110.

When the current map update mode is the direct L2P update mode, the map management operation may be performed by flushing all the L2P segments stored in the controller memory 125 to the memory apparatus 110.

After performing the map management operation on the L2P information L2PT, the controller 120 may selectively change the map update mode based on a map update history.

Selectively changing the map update mode may include setting the map update mode to a mode different from the current mode or setting the map update mode to the same mode as the current mode, based on the map update history. The controller 120 may set the map update mode each time the map management operation is performed.

In some embodiments, when the map update mode is the P2L update mode, the controller 120 may perform the map management operation when any one of one or more first map management conditions is satisfied. In some embodiments, the first map management conditions may include that the number of L2P segments to be loaded from the memory apparatus 110 to the controller memory 125 in order to update map information according to the P2L information P2LT in a map management operation reaches a reference number. For example, at least one of the first map management conditions may be satisfied when the number of L2P segments to be loaded from the memory apparatus 110 to the controller memory 125 in order to update map information according to the P2L information P2LT in a map management operation reaches a reference number. In some embodiments, the first map management conditions may further include that the number of physical addresses for which map information is updated in the P2L information P2LT during a predetermined period reaches a reference number. For example, at least one of the first map management conditions may be satisfied when the number of physical addresses for which map information is updated in the P2L information P2LT during a predetermined period reaches a reference number. In some embodiments, the first map management conditions may further include that the total size of data stored in response to one or more write requests during a predetermined period (hereinafter, size of write data during a predetermined period) reaches a reference size. For example, at least one of the first map management conditions may be satisfied when the total size of data stored in response to one or more write requests during a predetermined period (hereinafter, size of write data during a predetermined period) reaches a reference size.

In some embodiments, when the map update mode is the direct L2P update mode, the controller 120 may perform the map management operation when any one of one or more second map management conditions is satisfied. In some embodiments, the second map management conditions may include that the number of L2P segments loaded into the controller memory 125 reaches a reference number. For example, at least one of the second map management conditions may be satisfied when the number of L2P segments loaded into the controller memory 125 reaches a reference number. In some embodiments, the second map management conditions may further include that the number of logical addresses for which map information is updated in the L2P segments during a predetermined period reaches a reference number. For example, at least one of the second map management conditions may be satisfied when the number of logical addresses for which map information is updated in the L2P segments during a predetermined period reaches a reference number. In some embodiments, the second map management conditions may further include that the size of write data during a predetermined period reaches a reference size. For example, at least one of the second map management conditions may be satisfied when the size of write data during a predetermined period reaches a reference size.

The map update history may reflect a workload of the host device, and thus the controller 120 may select the map update mode appropriate for the workload of the host device.

The controller 120 may select the map update mode based on at least one of various items in the map update history.

Specifically, in some implementations, the map update history may include the number of L2P segments flushed from the controller memory 125 to the memory apparatus 110 in the map management operation. The controller 120 may set the map update mode by comparing the number of flushed L2P segments with the reference number. In one example, when the number of flushed L2P segments exceeds the reference number, the controller 120 may set the map update mode to the P2L update mode, and when the number of flushed L2P segments does not exceed the reference number, the controller 120 may set the map update mode to the direct L2P update mode.

In some embodiments, the map update history may include a range of logical addresses corresponding to one or more write requests received from the host device during a predetermined period. The controller 120 may determine a difference between a maximum value and a minimum value among the logical addresses corresponding to the write requests as the range of the logical addresses, and set the map update mode by comparing the difference with a reference value. Specifically, in one example, when the difference exceeds the reference value, the controller 120 may set the map update mode to the P2L update mode, and when the difference does not exceed the reference value, the controller 120 may set the map update mode to the direct L2P update mode. The predetermined period may be a period from the completion of a second map management operation immediately preceding a first map management operation until the completion of the first map management operation. In some embodiments, the predetermined period may be longer or shorter than the period described above.

In some embodiments, the map update history may include a mode count corresponding to a period during which the current map update mode has been maintained. The controller 120 may set the map update mode by comparing the mode count with a reference count. Specifically, in one example, when the mode count exceeds the reference count, the controller 120 may change the map update mode to a mode different from the current mode, and when the mode count does not exceed the reference count, the controller 120 may maintain the map update mode as the current mode.

At least some of various judgment criteria (e.g., the reference number, the reference size, the reference value, the reference count, or others) referred to by the controller 120 may be the same or may all be different. The judgment criteria may be set in advance to values that lead to optimal operational performance through a test during manufacturing. The judgment criteria may also be changed by the controller 120 during the operation of the storage device 100.

In some embodiments of the disclosed technology, the controller 120 may delay a map management operation by operating in an appropriate map update mode according to the workload of the host device, thereby reducing the overhead of the storage device 100 and improving operational performance of the storage device 100.

Figure 2:
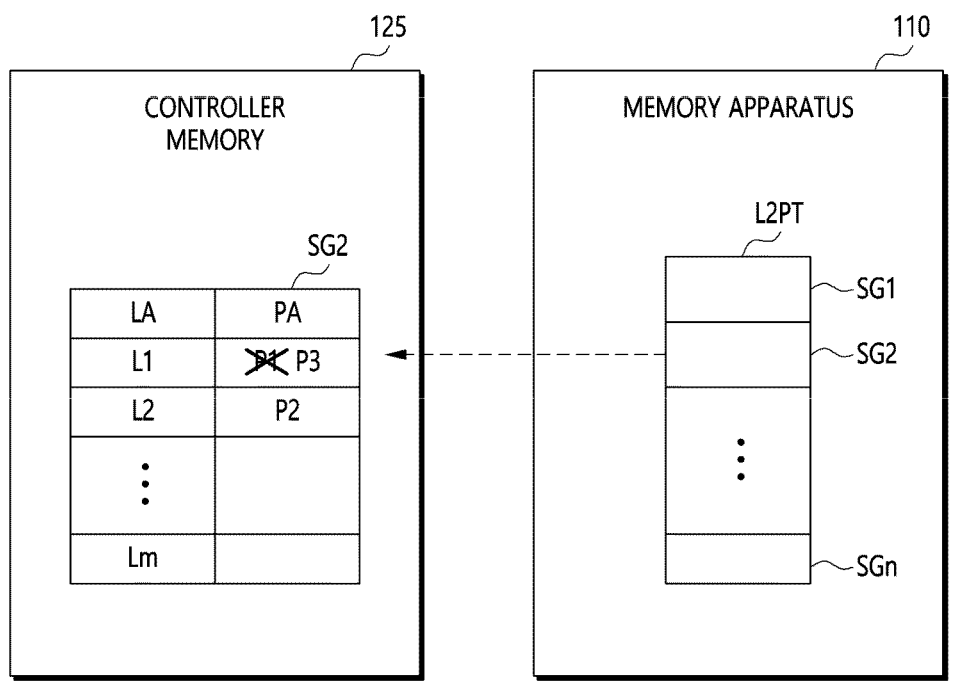
FIG. 2 is a diagram for explaining a direct L2P update mode based on an embodiment of the disclosed technology.

FIG. 2 is a diagram for explaining the direct L2P update mode based on an embodiment of the disclosed technology.

Referring to FIG. 2, the L2P information L2PT may include a plurality of L2P segments SG1 to SGn. The L2P segments SG1 to SGn may each correspond to groups of logical addresses. For example, the L2P segment SG1 may correspond to consecutive logical addresses from 0 to 99, and the L2P segment SG2 may correspond to consecutive logical addresses from 100 to 199. In some embodiments, logical addresses corresponding to each of the L2P segments SG1 to SGn may be discontinuous.

Each of the L2P segments SG1 to SGn may include map information on corresponding logical addresses. Specifically, each of the L2P segments SG1 to SGn may include information on physical addresses mapped to corresponding logical addresses.

The controller 120 may determine the physical address mapped to the logical address by referring to the L2P information L2PT. For example, the controller 120 may determine a value indicated by an index corresponding to a logical address in the L2P information L2PT as a physical address mapped to the logical address.

The L2P information L2PT may include map information on all logical addresses used by the host device and, accordingly, may have a very large size. Accordingly, the controller 120 may store the L2P information L2PT in the memory apparatus 110 and load only one or more necessary L2P segments of the L2P information L2PT from the memory apparatus 110 to the controller memory 125, so that the controller memory 125 may update or refer to the L2P segments. In other words, the L2P segment may be a unit loaded from the memory apparatus 110 to the controller memory 125.

When the current map update mode is the direct L2P update mode, the controller 120 may directly update the L2P segment in the controller memory 125 in response to a write request. As will be described in detail with reference to FIG. 3, immediately updating the L2P segment may mean updating the L2P segment without updating the P2L information P2LT, rather than updating the P2L information P2LT and then updating the L2P segment based on the P2L information P2LT.

For example, in response to a write request, data corresponding to a logical address L1 may be stored in a memory area corresponding to a physical address P3 in the memory apparatus 110. In such a case, the controller 120 may load the L2P segment SG2 related to the logical address L1 into the controller memory 125 in response to the write request. If the L2P segment SG2 has already been loaded into the controller memory 125, the process of loading the L2P segment SG2 into the controller memory 125 may be skipped. The L2P segment SG2 may include information on physical addresses PA mapped to logical addresses LA and L1 to Lm. The controller 120 may update the L2P segment SG2 by mapping the physical address P3 to the logical address L1 in the L2P segment SG2 loaded into the controller memory 125. A physical address P1 previously mapped to the logical address L1 in the L2P segment SG2 may be a physical address of a memory area where previous data corresponding to the logical address L1 was stored.

FIG. 2 illustrates that only the L2P segment SG2 is stored in the controller memory 125 by way of example. However, the controller 120 may also load other L2P segments from the memory apparatus 110 to the controller memory 125 in response to other write requests. Subsequently, when one of the second map management conditions is satisfied, the controller 120 may perform the map management operation. When the current map update mode is the direct L2P update mode, the map management operation may include an operation for flushing all L2P segments stored in the controller memory 125 to the memory apparatus 110.

Figure 3:
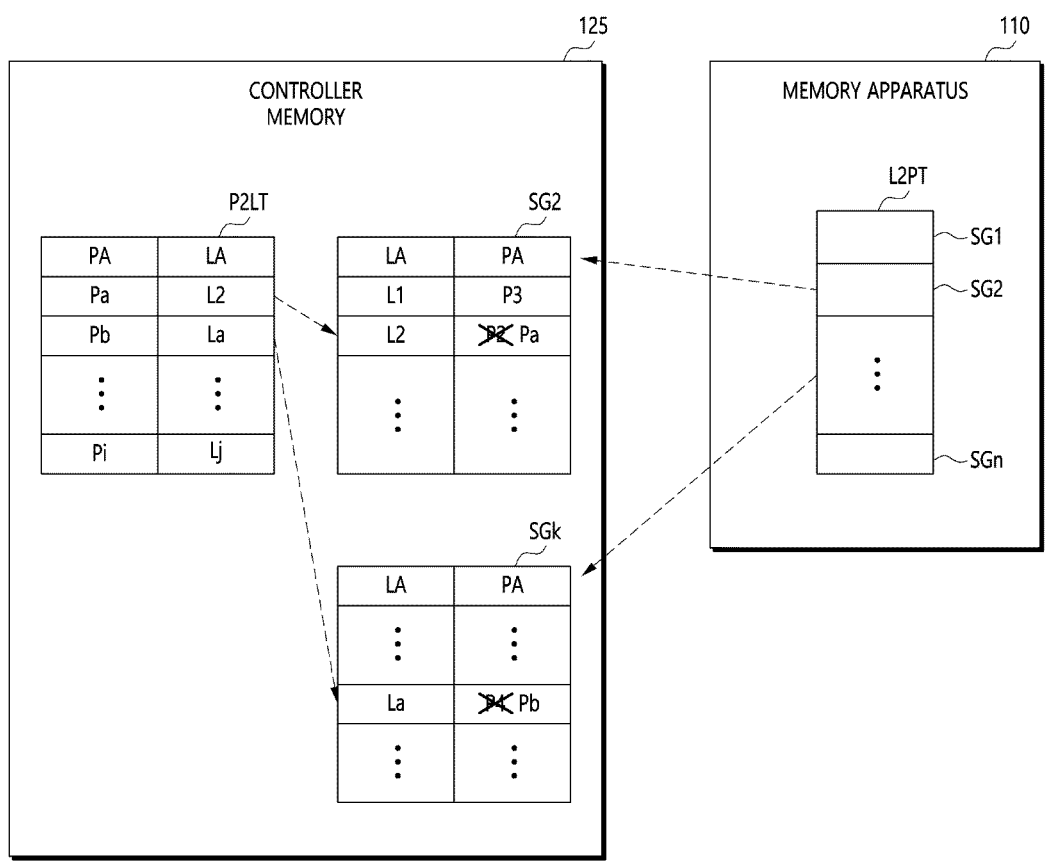
FIG. 3 is a diagram for explaining a physical to logical (P2L) update mode based on an embodiment of the disclosed technology.

FIG. 3 is a diagram for explaining the P2L update mode based on an embodiment of the disclosed technology.

Referring to FIG. 3, the P2L information P2LT may include map information on a plurality of physical addresses PA and Pa to Pi. Specifically, the P2L information P2LT may include information on logical addresses LA mapped to the plurality of physical addresses Pa to Pi. The physical addresses Pa to Pi included in the P2L information P2LT may be continuous or discontinuous.

In some embodiments, the controller 120 may manage the P2L information P2LT in predetermined memory units. In other words, the physical addresses Pa to Pi corresponding to the P2L information P2LT may be physical addresses of memory areas included in a predetermined memory unit. For example, a memory unit corresponding to the P2L information P2LT may be a memory block. The memory block may be a unit in which the memory apparatus 110 performs an erase operation.

When the current map update mode is the P2L update mode, the controller 120 may update the P2L information P2LT in the controller memory 125 in response to a write request. For example, data corresponding to a logical address may be stored in a memory area corresponding to a physical address in response to a write request. In such a case, the controller 120 may update the P2L information P2LT by mapping a logical address to a physical address in the P2L information P2LT in response to the write request.

Subsequently, the controller 120 may update one or more L2P segments based on the P2L information P2LT by performing a map management operation. That is, the map management operation in the direct L2P update mode may be done by immediately flushing L2P segments stored in the controller memory 125 to the memory apparatus 110 because the L2P segments have already been updated, but the map management operation in the P2L update mode may require a process of updating L2P segments based on the P2L information P2LT before the L2P segments are loaded into the controller memory 125 and then flushed to the memory apparatus 110.

Specifically, in some implementations, when the current map update mode is the P2L update mode, the controller 120 may perform the map management operation as will be described below. First, the controller 120 may load one or more L2P segments related to one or more logical addresses included in the P2L information P2LT from the memory apparatus 110 to the controller memory 125. The controller 120 may update map information on the L2P segments loaded into the controller memory 125 to match map information on the P2L information P2LT. For example, since the P2L information P2LT includes logical addresses L2 and La, the controller 120 may load the L2P segment SG2 related to the logical address L2 and the L2P segment SGk related to the logical address La from the memory apparatus 110 to the controller memory 125. The controller 120 may map the physical address Pa to the logical address L2 in the L2P segment SG2, and map the physical address Pb to the logical address La in the L2P segment SGk. FIG. 3 illustrates that only two L2P segments are loaded into the controller memory 125 by way of example. However, the controller 120 may also load other necessary L2P segments into the controller memory 125. Subsequently, the controller 120 may flush all L2P segments loaded into the controller memory 125, including the L2P segments SG2 and SGk, to the memory apparatus 110. After performing the map management operation, the controller 120 may remove the P2L information P2LT from the controller memory 125.

In some embodiments, when the current map update mode is the P2L update mode, the controller 120 may selectively update a target L2P segment list each time the P2L information P2LT is updated. The target L2P segment list may include L2P segments (hereinafter, referred to as target L2P segments) that need to be loaded from the memory apparatus 110 to the controller memory 125 in order to update map information according to the P2L information P2LT in a map management operation. Accordingly, when performing a map management operation, the controller 120 may load the L2P segments included in the target L2P segment list from the memory apparatus 110 to the controller memory 125. For example, when mapping the logical address L2 to the physical address Pa in the P2L information P2LT, the controller 120 may add the L2P segment SG2 related to the logical address L2 to the target L2P segment list. Similarly, when mapping the logical address La to the physical address Pb in the P2L information P2LT, the controller 120 may add the L2P segment SGk related to the logical address La to the target L2P segment list. In a case that the controller 120 maps the logical address L2 to the physical address Pa in the P2L information P2LT, when the L2P segment SG2 related to the logical address L2 already exists in the target L2P segment list, the L2P segment SG2 may not be newly added to the target L2P segment list.

In some embodiments, when the current map update mode is the P2L update mode, the controller 120 may selectively update the number of target L2P segments each time the P2L information P2LT is updated. When the controller 120 manages the target L2P segment list, the number of target L2P segments may be the number of L2P segments included in the target L2P segment list. The controller 120 may increase the number of target L2P segments each time an L2P segment is added to the target L2P segment list. The controller 120 may reset the target L2P segment list and the number of target L2P segments after performing a map management operation.

Figure 4:
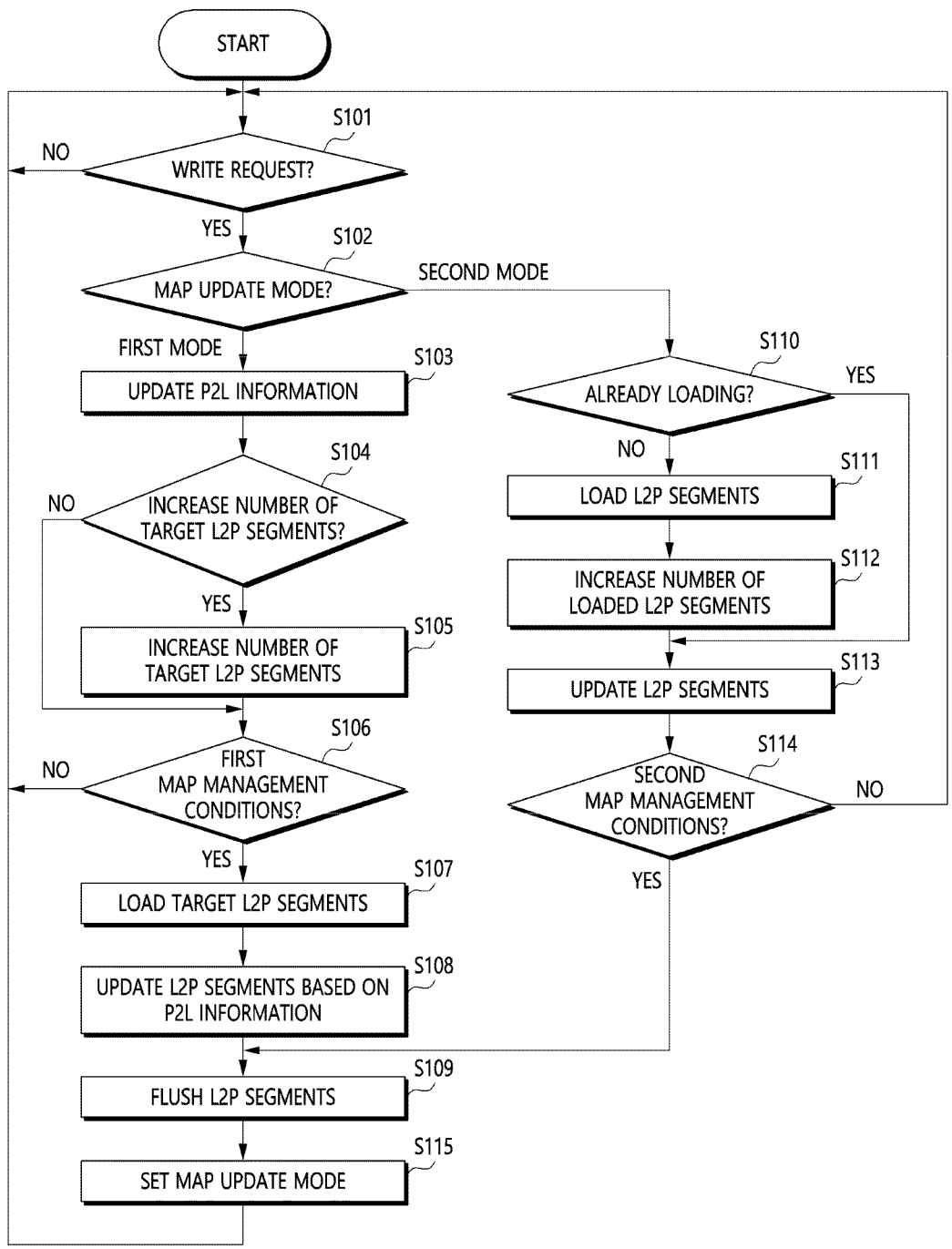
FIG. 4 is a flowchart showing an operation of the storage device of FIG. 1 based on an embodiment of the disclosed technology.

FIG. 4 is a flow chart illustrating the operation of the storage device 100 of FIG. 1 based on an embodiment of the disclosed technology.

Referring to FIG. 4, in operation S101, the controller 120 may determine whether a write request has been received from the external device. When it is determined that no write request has been received ("no"), the procedure may repeat operation S101. When it is determined that the write request has been received ("yes"), the procedure may proceed to operation S102.

In operation S102, the controller 120 may determine the current map update mode. When the current map update mode is the first mode, that is, the P2L update mode, the procedure may proceed to operation S103. When the current map update mode is the second mode, that is, the direct L2P update mode, the procedure may proceed to operation S110.

In operation S103, the controller 120 may update the P2L information P2LT stored in the controller memory 125 in response to the write request. Updating the P2L information P2LT may include mapping a logical address corresponding to data (hereinafter, referred to as a logical address corresponding to the write request) to a physical address of a memory area storing data in response to the write request.

In operation S104, the controller 120 may determine whether to increase the number of target L2P segments. The target L2P segments may be L2P segments that need to be loaded from the memory apparatus 110 to the controller memory 125 in order to update map information according to the P2L information P2LT in a map management operation. The controller 120 may determine whether to increase the number of target L2P segments by referring to the target L2P segment list.

For example, when a L2P segment related to the logical address corresponding to the write request does not exist in the target L2P segment list, the controller 120 may add the L2P segment to the target L2P segment list and determine to increase the number of target L2P segments. When it is determined to increase the number of target L2P segments (that is, yes), the procedure may proceed to operation S105.

When the L2P segment related to the logical address corresponding to the write request already exists in the target L2P segment list, the controller 120 may determine not to increase the number of target L2P segments. When it is determined not to increase the number of target L2P segments (that is, no), the procedure may proceed to operation S106.

In operation S105, the controller 120 may increase the number of target L2P segments.

In operation S106, the controller 120 may determine whether one of one or more first map management conditions is satisfied. When it is determined that any one of the first map management conditions is satisfied (that is, yes), the procedure may proceed to operation S107. When it is determined that none of the first map management conditions are satisfied (that is, no), the procedure may proceed to operation S101. Operation S106 is described in more detail with reference to FIGS. 5 to 7.

Operations S107 to S109 may be included in the map management operation. Specifically, in operation S107, the controller 120 may load target L2P segments included in the target L2P segment list from the memory apparatus 110 to the controller memory 125.

In operation S108, the controller 120 may update the L2P segments loaded into the controller memory 125 based on the P2L information P2LT. Updating the L2P segments may include updating map information on the L2P segments to match map information on the P2L information P2LT.

In operation S109, the controller 120 may flush the L2P segments stored in the controller memory 125 to the memory apparatus 110.

When the procedure proceeds to operation S110, the controller 120 may determine whether the L2P segment related to the logical address corresponding to the write request has already been loaded into the controller memory 125. When it is determined that the L2P segment has already been loaded ("yes"), the procedure may proceed to operation S113. When it is determined that the L2P segment has not been loaded ("no"), the procedure may proceed to operation S111.

In operation S111, the controller 120 may load the L2P segment related to the logical address corresponding to the write request from the memory apparatus 110 to the controller memory 125.

In operation S112, the controller 120 may increase the number of loaded L2P segments. When the current map update mode is the direct L2P update mode, the number of loaded L2P segments may be the number of L2P segments loaded into the controller memory 125.

In operation S113, the controller 120 may update the L2P segment loaded into the controller memory 125. Updating the L2P segment may include mapping the physical address of an area where data corresponding to the write request is stored to the logical address corresponding to the write request.

In operation S114, the controller 120 may determine whether any one of one or more second map management conditions is satisfied. When it is determined that any one of the second map management conditions is satisfied (that is, yes), the procedure may proceed to operation S109. When it is determined that none of the second map management conditions are satisfied (that is, no), the procedure may proceed to operation S101. Operation S114 is described in more detail with reference to FIGS. 8 to 10.

In operation S115, the controller 120 may set the map update mode based on the map update history. The controller 120 may set the map update mode by changing the current map update mode to another map update mode or maintaining the current map update mode as is. As will be described in more detail with reference to FIGS. 10 to 13, the map update history may include the number of L2P segments flushed in an immediately preceding map management operation, a range of logical addresses corresponding to one or more write requests received from the host device during a predetermined period, and a mode count. This map update history may reflect the workload of the host device, and thus the controller 120 may select a map update mode appropriate for the workload of the host device.

Figure 5:
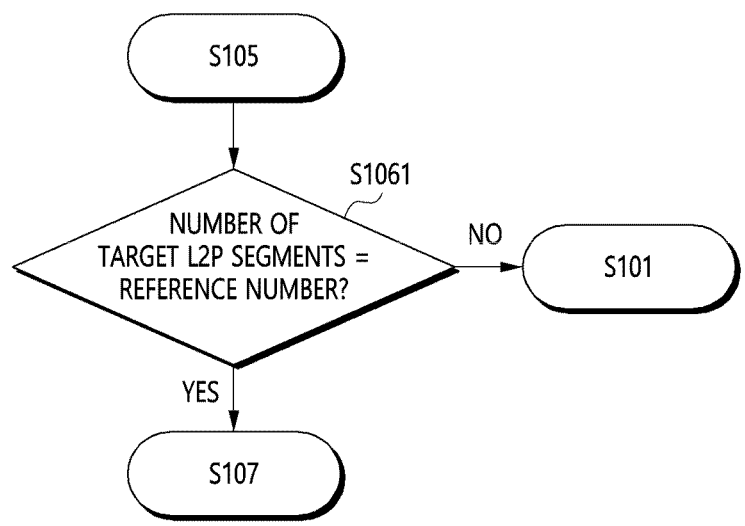
FIGS. 5 to 7 are flowcharts illustrating an operation of a controller of FIG. 1 for judging first map management conditions in the P2L update mode based on an embodiment of the disclosed technology.

FIG. 5 is a flowchart showing the operation of the controller 120 for judging the first map management conditions in the P2L update mode based on an embodiment of the disclosed technology. The procedure illustrated in FIG. 5 may be an example of operation S106 in FIG. 4.

In some embodiments, when the current map update mode is the P2L update mode, the first map management conditions may include that the number of target L2P segments reaches a reference number. In such a case, when the procedure proceeds from operation S105 to operation S106 in FIG. 4, the controller 120 may determine whether the number of target L2P segments has reached the reference number in operation S1061. The reference number may be set in consideration of the capacity of the controller memory 125. The reference number may be equal to or less than the maximum number of L2P segments that may be stored in the controller memory 125.

When it is determined in operation S1061 that the number of target L2P segments has reached the reference number ("yes"), the procedure may proceed to operation S107 in FIG. 4. When it is determined in operation S1061 that the number of target L2P segments has not reached the reference number ("no"), the procedure may proceed to operation S101 of FIG. 4.

In summary, when the map update mode is the P2L update mode, no map management operation may be performed until the number of target L2P segments reaches the reference number. Accordingly, according to the example of FIG. 5, the map management operation may be delayed, thereby reducing the overhead of the storage device 100.

Figure 6:
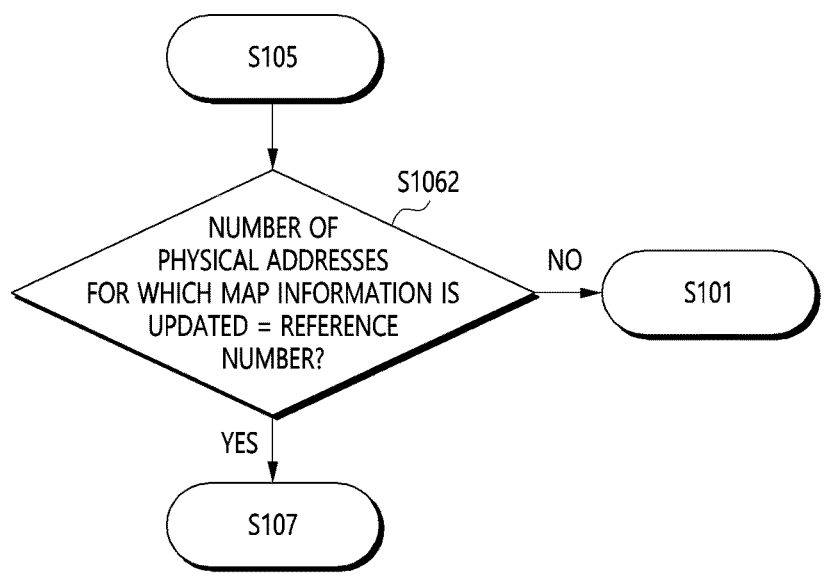

FIG. 6 is a flowchart showing the operation of the controller 120 for judging the first map management conditions in the P2L update mode based on an embodiment of the disclosed technology. The procedure illustrated in FIG. 6 may be an example of operation S106 in FIG. 4.

In some embodiments, when the current map update mode is the P2L update mode, the first map management conditions may include that the number of physical addresses for which map information is updated in the P2L information P2LT during a predetermined period reaches a reference number. In such a case, when the procedure proceeds from operation S105 to operation S106 in FIG. 4, the controller 120 may determine whether the number of physical addresses for which map information is updated in the P2L information P2LT during the predetermined period has reached the reference number in operation S1062. Physical addresses for which map information is updated in the P2L information P2LT during the predetermined period may be physical addresses of memory areas where data is stored in response to one or more write requests received from the host device during the predetermined period. The predetermined period may be, for example, a period elapsed from the completion of an immediately preceding map management operation to the present. The reference number may be a memory unit corresponding to the P2L information P2LT, for example, the number of physical addresses of memory areas included in a memory block.

When it is determined in operation S1062 that the number of physical addresses for which map information is updated in the P2L information P2LT during the predetermined period has reached the reference number ("yes"), the procedure may proceed to operation S107 in FIG. 4. When it is determined in operation S1062 that the number of physical addresses for which map information is updated in the P2L information P2LT during the predetermined period has not reached the reference number ("no"), the procedure may proceed to operation S101 in FIG. 4.

Figure 7:
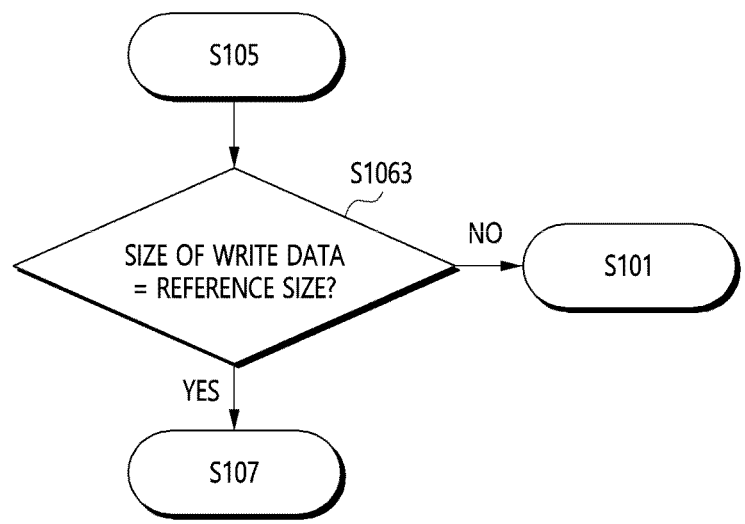

FIG. 7 is a flowchart showing the operation of the controller 120 for judging the first map management conditions in the P2L update mode based on an embodiment of the disclosed technology. The procedure illustrated in FIG. 7 may be an example of operation S106 in FIG. 4.

In some embodiments, when the current map update mode is the P2L update mode, the first map management conditions may include that the size of write data during a predetermined period reaches a reference size. In such a case, when the procedure proceeds from operation S105 to operation S106 in FIG. 4, the controller 120 may determine whether the size of the write data during the predetermined period has reached the reference size in operation S1063. The predetermined period may be, for example, a period elapsed from the completion of an immediately preceding map management operation to the present. The reference size may be the size of a memory unit in which the controller 120 manages the P2L information P2LT, for example, a memory block.

When it is determined in operation S1063 that the size of the write data during the predetermined period has reached the reference size ("yes"), the procedure may proceed to operation S107 in FIG. 4. When it is determined in operation S1063 that the size of the write data during the predetermined period has not reached the reference size ("no"), the procedure may proceed to operation S101 in FIG. 4.

In the examples of FIGS. 6 and 7, the controller 120 may perform a map management operation somewhat regularly according to the operation of the host device, thereby substantially preventing map information stored in the controller memory 125 from being lost because the supply of power to the storage device 100 is abnormally interrupted.

Figure 8:
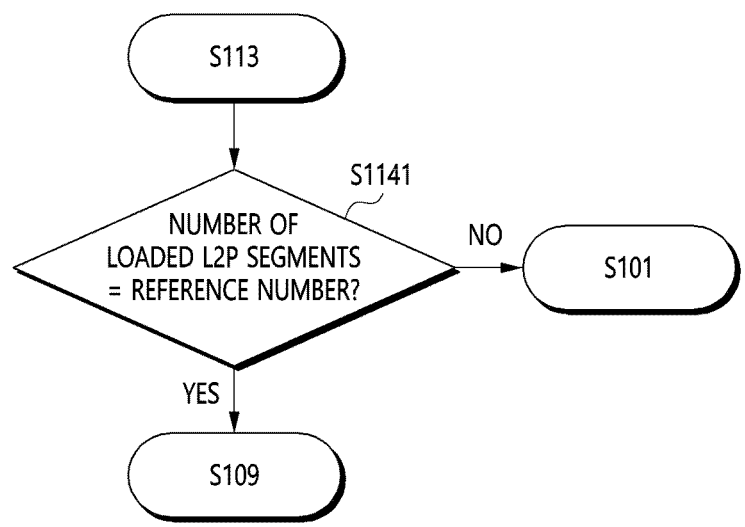
FIGS. 8 to 10 are flowcharts illustrating an operation of the controller of FIG. 1 for judging second map management conditions in the direct L2P update mode based on an embodiment of the disclosed technology.

FIG. 8 is a flowchart showing the operation of the controller 120 for judging the second map management conditions in the direct L2P update mode based on an embodiment of the disclosed technology. The procedure illustrated in FIG. 8 may be an example of operation S114 in FIG. 4.

In some embodiments, when the current map update mode is the direct L2P update mode, the second map management conditions may include that the number of L2P segments loaded into the controller memory 125 reaches the reference number. In such a case, when the procedure proceeds from operation S113 to operation S114 in FIG. 4, the controller 120 may determine whether the number of loaded L2P segments has reached the reference number in operation S1141. The reference number may be set in consideration of the capacity of the controller memory 125. The reference number may be equal to or less than the maximum number of L2P segments that may be stored in the controller memory 125.

When it is determined in operation S1141 that the number of loaded L2P segments has reached the reference number ("yes"), the procedure may proceed to operation S109 in FIG. 4. When it is determined in operation S1141 that the number of loaded L2P segments has not reached the reference number ("no"), the procedure may proceed to operation S101 in FIG. 4.

In summary, when the map update mode is the direct L2P update mode, no map management operation may be performed until the number of loaded L2P segments reaches the reference number. Accordingly, in the example of FIG. 8, the map management operation may be delayed, thereby reducing the overhead of the storage device 100.

Figure 9:
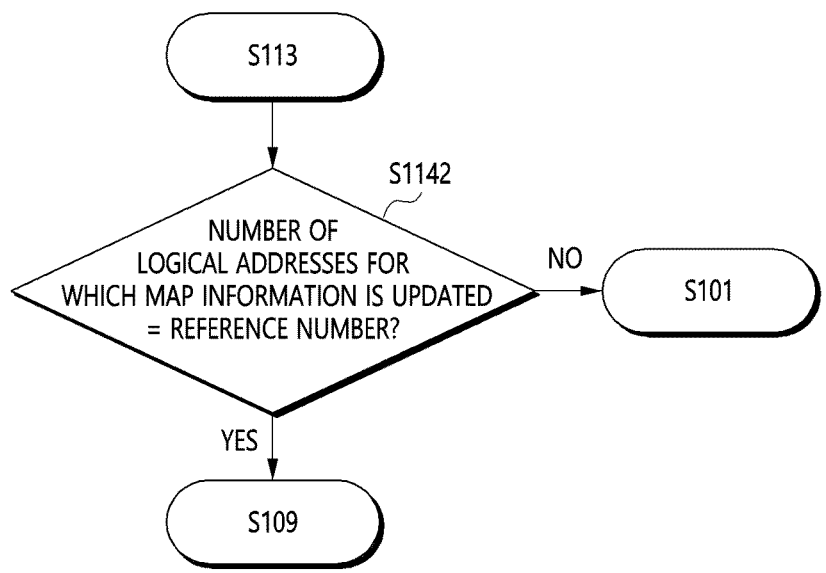

FIG. 9 is a flowchart showing the operation of the controller 120 for judging the second map management conditions in the direct L2P update mode based on an embodiment of the disclosed technology. The procedure illustrated in FIG. 9 may be an example of operation S114 in FIG. 4.

In some embodiments, when the current map update mode is the direct L2P update mode, the second map management conditions may include that the number of logical addresses for which map information is updated in the L2P segments stored in the controller memory 125 during a predetermined period reaches a reference number. In such a case, when the procedure proceeds from operation S113 to operation S114 in FIG. 4, the controller 120 may determine whether the number of logical addresses for which map information is updated in the L2P segments during the predetermined period has reached the reference number in operation S1142. Logical addresses for which map information is updated in the L2P segments during the predetermined period may be logical addresses corresponding to one or more write requests received from the host device during the predetermined period. The predetermined period may be, for example, a period elapsed from the completion of an immediately preceding map management operation to the present.

When it is determined in operation S1142 that the number of logical addresses for which map information is updated in the L2P segments during the predetermined period has reached the reference number ("yes"), the procedure may proceed to operation S109 in FIG. 4. When it is determined in operation S1142 that the number of logical addresses for which map information is updated in the L2P segments during the predetermined period has not reached the reference number ("no"), the procedure may proceed to operation S101 in FIG. 4.

Figure 10:
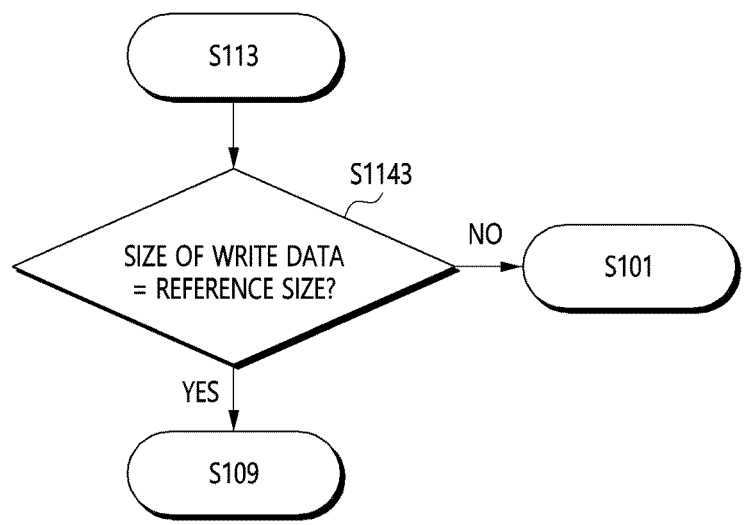

FIG. 10 is a flowchart showing the operation of the controller 120 for judging the second map management conditions in the direct L2P update mode based on an embodiment of the disclosed technology. The procedure illustrated in FIG. 10 may be an example of operation S114 in FIG. 4.

In some embodiments, when the current map update mode is the direct L2P update mode, the second map management conditions may include that the size of write data during the predetermined period reaches a reference size. In such a case, when the procedure proceeds from operation S113 to operation S114 in FIG. 4, the controller 120 may determine whether the size of the write data during the predetermined period has reached the reference size in operation S1143. The predetermined period may be, for example, a period elapsed from the completion of an immediately preceding map management operation to the present.

When it is determined in operation S1143 that the size of the write data during the predetermined period has reached the reference size ("yes"), the procedure may proceed to operation S109 in FIG. 4. When it is determined in operation S1143 that the size of the write data during the predetermined period has not reached the reference size ("no"), the procedure may proceed to operation S101 in FIG. 4.

In the examples of FIGS. 9 and 10, when the map update mode is the direct L2P update mode, the smaller the reference number and the reference size, the more frequently the map management operation may be performed. Accordingly, map information temporarily stored in the controller memory 125 may be prevented from being lost because the supply of power to the storage device 100 is abnormally interrupted.

Figure 11:
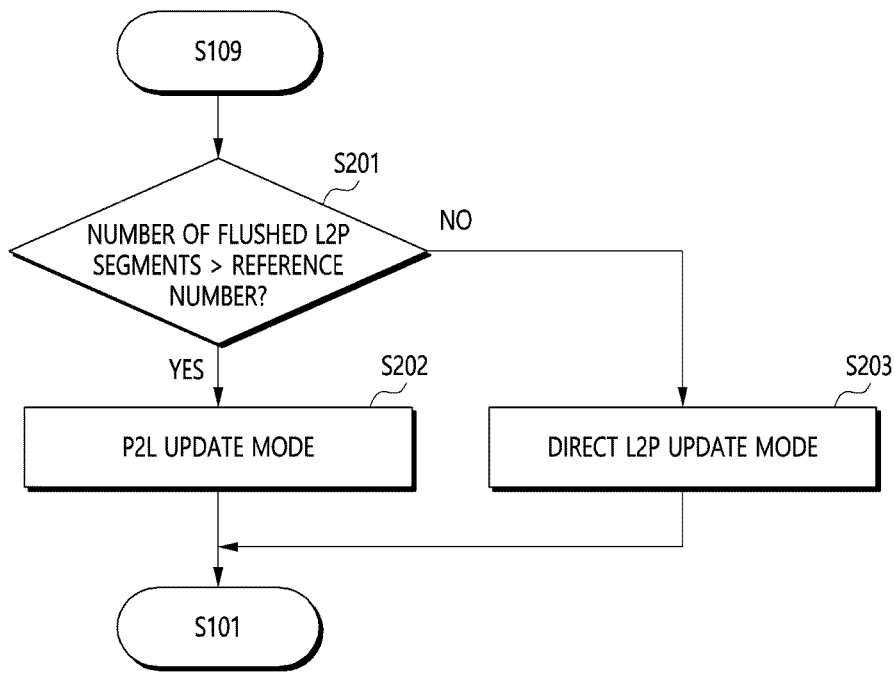
FIGS. 11 to 13 are flowcharts illustrating an operation of the controller of FIG. 1 for setting a map update mode based on an embodiment of the disclosed technology.

FIG. 11 is a flowchart showing the operation of the controller 120 for setting the map update mode based on an embodiment of the disclosed technology. The procedure illustrated in FIG. 11 may be an example of operation S115 in FIG. 4.

When the procedure proceeds from operation S109 to operation S115 in FIG. 4, the controller 120 may determine whether the number of flushed L2P segments exceeds a reference number in operation S201. The number of flushed L2P segments may be the number of L2P segments flushed from the controller memory 125 to the memory apparatus 110 in an immediately preceding map management operation. The reference number may be set in consideration of the capacity of the controller memory 125. The reference number may be equal to or less than the maximum number of L2P segments that may be stored in the controller memory 125. When it is determined in operation S201 that the number of flushed L2P segments exceeds the reference number ("yes"), the procedure may proceed to operation S202. When it is determined in operation S201 that the number of flushed L2P segments does not exceed the reference number ("no"), the procedure may proceed to operation S203.

In operation S202, the controller 120 may set the map update mode to the P2L update mode. That is, when the current map update mode is the P2L update mode, the controller 120 may maintain the map update mode as the P2L update mode, and when the current map update mode is the direct L2P update mode, the controller 120 may change the map update mode to the P2L update mode. Subsequently, the procedure may proceed to operation S101 in FIG. 4.

In operation S203, the controller 120 may set the map update mode to the direct L2P update mode. That is, when the current map update mode is the direct L2P update mode, the controller 120 may maintain the map update mode as the direct L2P update mode, and when the current map update mode is the P2L update mode, the controller 120 may change the map update mode to the direct L2P update mode. Subsequently, the procedure may proceed to operation S101 in FIG. 4.

Figure 12:
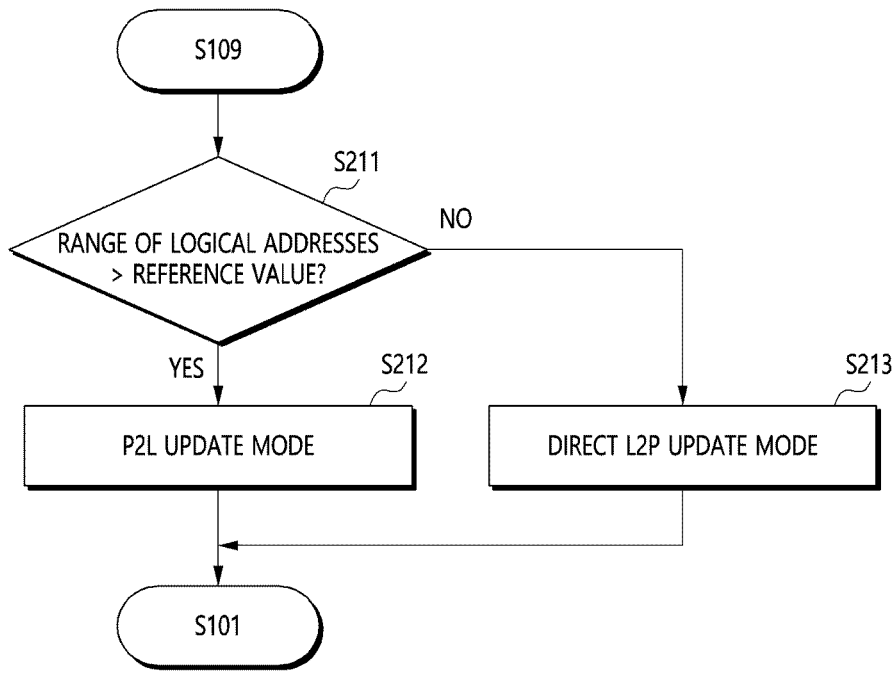

FIG. 12 is a flow chart illustrating the operation of the controller 120 for setting the map update mode based on an embodiment of the disclosed technology. The procedure illustrated in FIG. 12 may be an example of operation S115 in FIG. 4.

When the procedure proceeds from operation S109 to operation S115 in FIG. 4, the controller 120 may determine whether the range of logical addresses corresponding to one or more write requests received from the host device during a predetermined period exceeds a reference value in operation S211. Logical addresses corresponding to one or more write requests received from the host device during the predetermined period may be logical addresses for which map information is updated in L2P segments during the predetermined period. The controller 120 may determine the difference between a maximum value and a minimum value among logical addresses corresponding to one or more write requests received from the host device during the predetermined period, as the range of the logical addresses.

The predetermined period may be, for example, a period from after a second map management operation immediately preceding a first map management operation is completed to when the first map management operation is completed.

When the current map update mode is the P2L update mode, logical addresses corresponding to one or more write requests received from the host device during the predetermined period may be logical addresses for which map information is updated in L2P segments through an immediately preceding map management operation. Accordingly, the controller 120 may determine whether the range of the logical addresses for which map information is updated in the L2P segments through the immediately preceding map management operation in operation S211 exceeds the reference value.

When it is determined in operation S211 that the range of the logical addresses corresponding to the one or more write requests received from the host device during the predetermined period exceeds the reference value (that is, yes), the procedure may proceed to operation S212. When it is determined in operation S211 that the range of the logical addresses corresponding to the one or more write requests received from the host device during the predetermined period does not exceed the reference value (that is, no), the procedure may proceed to operation S213.

In operation S212, the controller 120 may set the map update mode to the P2L update mode. That is, when the current map update mode is the P2L update mode, the controller 120 may maintain the map update mode as the P2L update mode, and when the current map update mode is the direct L2P update mode, the controller 120 may change the map update mode to the P2L update mode. Subsequently, the procedure may proceed to operation S101 in FIG. 4.

In operation S213, the controller 120 may set the map update mode to the direct L2P update mode. That is, when the current map update mode is the direct L2P update mode, the controller 120 may maintain the map update mode as the direct L2P update mode, and when the current map update mode is the P2L update mode, the controller 120 may change the map update mode to the direct L2P update mode. Subsequently, the procedure may proceed to operation S101 in FIG. 4.

In the examples of FIGS. 11 and 12, with reference to the number of L2P segments flushed through the map management operation or the range of logical addresses corresponding to one or more write requests received from the host device during a predetermined period, the controller 120 may determine whether the operation of the host device is being performed on a narrow range of logical addresses or a wide range of logical addresses. As a consequence, when the operation of the host device is being performed in a narrow range of logical addresses, the controller 120 may operate in the direct L2P update mode. In such a case, the controller 120 may improve operational performance by delaying the map management operation even though random write requests causing overhead in the map management operation are received at a high frequency.

Figure 13:
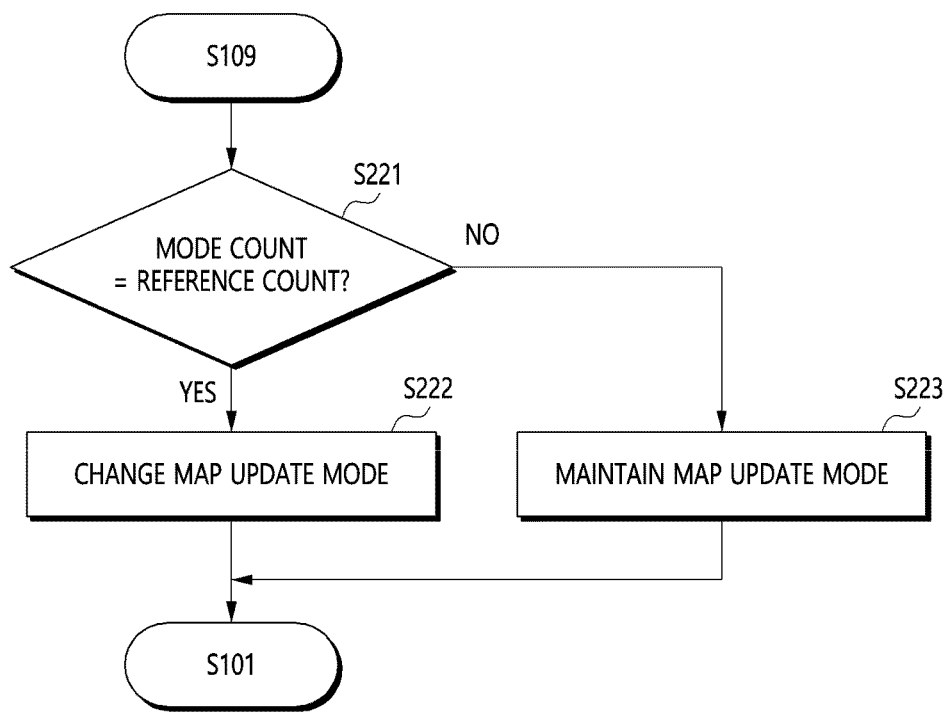

FIG. 13 is a flowchart showing the operation of the controller 120 for setting the map update mode based on an embodiment of the disclosed technology. The procedure illustrated in FIG. 13 may be an example of operation S115 in FIG. 4.

When the procedure proceeds from operation S109 to operation S115 in FIG. 4, the controller 120 may determine whether the mode count has reached a reference count in operation S221. The mode count may be a count that is increased whenever it is determined to maintain the current map update mode as is after a map management operation is performed, and is initialized when it is determined to change the current map update mode to another map update mode. In other words, the mode count may indicate how long the current map update mode has been maintained. The mode count may correspond to a period during which the current map update mode is maintained. The mode count may be managed by the controller 120. When it is determined in operation S221 that the mode count has reached the reference count ("yes"), the procedure may proceed to operation S222. When it is determined in operation S221 that the mode count has not reached the reference count ("no"), the procedure may proceed to operation S223.

In operation S222, the controller 120 may change the map update mode. That is, when the current map update mode is the P2L update mode, the controller 120 may change the current map update mode to the direct L2P update mode, and when the current map update mode is the direct L2P update mode, the controller 120 may change the current map update mode to the P2L update mode.

In operation S223, the controller 120 may maintain the current map update mode as is.

In the example of FIG. 13, when the current map update mode is continuously maintained, the controller 120 may change the map update mode. For example, the reference count may be determined based on a maximum value, an average value, or others of mode counts in various workloads where the same map update mode is continuously maintained and then changes. Accordingly, the controller 120 may predict in advance a situation in which the workload of the host device changes (e.g., a change from random write to sequential write, or vice versa), and set the map update mode more appropriately.

The technical features disclosed in this patent document can be implemented in various configurations or ways and the disclosed embodiments are merely examples of certain implementations. Variations and enhancements of the disclosed embodiments and other embodiments can be made based on what is disclosed and/or illustrated in this patent document.

What is claimed is:

1. A storage device comprising:
a memory apparatus configured to store data that includes logical to physical (L2P) information on mapping between logical addresses and physical addresses; and
a controller coupled to be in communication with the memory apparatus and configured to set a map update mode by selectively changing a current map update mode to a different map update mode based on a map update history after performing a map management operation for storing the L2P information in the memory apparatus,
wherein the controller includes a controller memory, and wherein the map update history includes a number of L2P segments flushed from the controller memory to the memory apparatus in the map management operation, and the controller sets the map update mode by comparing the number of the flushed L2P segments with a reference number.

2. The storage device according to claim 1, wherein upon a first determination that the number of the flushed L2P segments exceeds the reference number, the controller sets the map update mode to a physical to logical (P2L) update mode, or upon a second determination that the number of the flushed L2P segments does not exceed the reference number, the controller sets the map update mode to a direct L2P update mode.

3. The storage device according to claim 1, wherein the map update history includes a range of first logical addresses corresponding to one or more write requests received from an external device during a predetermined period.

4. The storage device according to claim 3, wherein the controller determines a difference between a maximum value and a minimum value among the first logical addresses as the range, and sets the map update mode by comparing the difference with a reference value.

5. The storage device according to claim 4, wherein, upon a first determination that the difference exceeds the reference value, the controller sets the map update mode to a P2L update mode, or upon a second determination that the difference does not exceed the reference value, the controller sets the map update mode to a direct L2P update mode.

6. The storage device according to claim 3, wherein the predetermined period is a period from when a second map management operation, which immediately precedes a first map management operation, is completed to when the first map management operation is completed.

7. The storage device according to claim 1, wherein the map update history includes a mode count corresponding to a period during which the current map update mode is maintained.

8. The storage device according to claim 7, wherein, upon a first determination that the mode count exceeds a reference count, the controller changes the map update mode to the different map update mode, or upon a second determination that the mode count does not exceed the reference count, the controller maintains the current map update mode.

9. The storage device according to claim 1, wherein in a case that the current map update mode is a P2L update mode, the controller performs the map management operation upon determination that a number of L2P segments to be loaded from the memory apparatus to the controller memory in order to update map information according to P2L information in the map management operation reaches a reference number.

10. The storage device according to claim 1, wherein, in a case that the current map update mode is a direct L2P update mode, the controller performs the map management operation upon determination that any one of one or more second map management conditions is satisfied, wherein the one or more second map management conditions include that a number of L2P segments loaded into the controller memory reaches a first reference number.

11. The storage device according to claim 10, wherein the one or more second map management conditions further include that a number of second logical addresses for which map information is updated in the L2P segments during a predetermined period reaches a second reference number.

12. The storage device according to claim 10, wherein the second map management conditions further include that a size of write data for a predetermined period reaches a reference size.

13. A storage device comprising:
a memory apparatus configured to store data including L2P segments; and
a controller coupled to be in communication with the memory apparatus and configured to include a controller memory and configured to perform a map management operation on first L2P segments based on a number of the first L2P segments to be loaded into the controller memory when a map update mode is a first mode, to perform the map management operation on second L2P segments based on a number of the second L2P segments loaded into the controller memory when the map update mode is a second mode different from the first mode, and to set the map update mode to the first mode or the second mode by comparing, with a reference number, a number of third L2P segments flushed from the controller memory to the memory apparatus in the map management operation.

14. The storage device according to claim 13, wherein the controller performs the map management operation in a first case that the map update mode is the first mode and the number of the first L2P segments reaches a first reference number, or in a second case that the map update mode is the second mode and the number of the second L2P segments reaches a second reference number.

15. The storage device according to claim 13, wherein, when the number of the third L2P segments exceeds the reference number, the controller determines the map update mode as the first mode, or when the number of the third L2P segments does not exceed the reference number, the controller determines the map update mode as the second mode.

16. The storage device according to claim 13, wherein, when the map update mode is the second mode, the controller determines whether to perform the map management operation further based on a number of logical addresses for which map information is updated in the second L2P segments during a predetermined period.

17. The storage device according to claim 13, wherein, when the map update mode is the second mode, the controller determines whether to perform the map management operation further based on a size of write data during a predetermined period.

* * * * *